(12) United States Patent
Zimmel

(10) Patent No.: US 6,712,523 B2
(45) Date of Patent: Mar. 30, 2004

(54) BULKHEAD ADAPTER WITH OPTICAL FIBER FOR SIGNAL ATTENUATION

(75) Inventor: Steven C. Zimmel, Minneapolis, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 104 days.

(21) Appl. No.: 09/872,772

(22) Filed: Jun. 1, 2001

(65) Prior Publication Data

US 2002/0181888 A1 Dec. 5, 2002

(51) Int. Cl.[7] .................................................. G02B 6/38
(52) U.S. Cl. ............................................ 385/72; 385/55
(58) Field of Search .............................. 385/72, 53, 55, 385/56, 74

(56) References Cited

U.S. PATENT DOCUMENTS

| | | | | |
|---|---|---|---|---|
| 4,995,688 A | * | 2/1991 | Anton et al. .................. | 385/53 |
| 5,109,468 A | | 4/1992 | Tamulevich et al. ......... | 385/140 |
| 5,113,462 A | * | 5/1992 | Clancy et al. ................. | 385/53 |
| 5,214,735 A | * | 5/1993 | Henneberger et al. ....... | 385/136 |
| 5,267,342 A | | 11/1993 | Takahashi et al. ........... | 385/140 |
| 5,317,663 A | | 5/1994 | Beard et al. ................... | 385/70 |
| 5,542,015 A | * | 7/1996 | Hultermans .................. | 385/60 |
| 5,633,963 A | * | 5/1997 | Rickenbach et al. ......... | 385/25 |
| 5,642,450 A | * | 6/1997 | Oda .............................. | 385/60 |
| 5,651,085 A | * | 7/1997 | Chia ............................. | 385/140 |
| 5,677,976 A | * | 10/1997 | Takahashi ..................... | 385/140 |
| 5,706,379 A | * | 1/1998 | Serafini et al. ............... | 385/75 |
| 5,737,464 A | * | 4/1998 | Underwood et al. .......... | 385/72 |
| 5,805,760 A | * | 9/1998 | Serafini et al. ............... | 385/147 |
| 5,883,995 A | | 3/1999 | Lu ................................. | 385/60 |
| 5,960,139 A | * | 9/1999 | Henning ....................... | 385/78 |
| 6,048,103 A | * | 4/2000 | Furukata et al. .............. | 385/73 |
| 6,102,581 A | * | 8/2000 | Deveau et al. ................ | 385/56 |
| 6,205,280 B1 | | 3/2001 | Wagoner et al. .............. | 385/140 |
| 6,253,017 B1 | | 6/2001 | Hartley et al. ................ | 385/140 |
| 6,275,643 B1 | * | 8/2001 | Bandy et al. .................. | 385/140 |
| 6,341,191 B1 | * | 1/2002 | Takahashi ...................... | 385/140 |
| 6,347,888 B1 | * | 2/2002 | Puetz ............................ | 385/53 |
| 6,461,055 B1 | * | 10/2002 | Zimmel ......................... | 385/73 |
| 6,471,412 B1 | * | 10/2002 | Belenkiy et al. .............. | 385/53 |

FOREIGN PATENT DOCUMENTS

| | | | | |
|---|---|---|---|---|
| EP | WO 0 306 243 A2 | 8/1988 | ............ | G02B/6/26 |
| JP | 62121405 | 6/1987 | ............ | G02B/6/00 |
| JP | 01279206 | 11/1989 | ............ | G02B/6/00 |
| JP | 08122531 | 5/1996 | ............ | G02B/6/00 |
| JP | 10246813 | 9/1998 | | |

OTHER PUBLICATIONS

ADC Telecommunications, Inc. Nertwork Connectivity Solutions, Front Cover, Table of Contents, pp. 125–127, Rear Cover, dated Feb., 2001.
Amphenol Corporation, On–line Catalog, Part No. 945–4X2XX–X10XX, 3 pages, dated May 17, 2001.
Amphenol Corporation, On–line Catalog, Part No. 942–10001–10001, 3 pages, dated May 17, 2001.

* cited by examiner

*Primary Examiner*—Hae Moon Hyeon
(74) *Attorney, Agent, or Firm*—Merchant & Gould P.C.

(57) ABSTRACT

The present invention relates to bulkhead adapters for optically connecting two strands of optical fibers and including a length of optical fiber within the adapter for attenuating signals passing from one fiber to the other. The attenuation optical fiber is held within an attenuation hub inside the housing of the adapter. Attenuation of optical fiber signals transmitted through the adapter may be provided by the optical fiber, by an offset fusion of two optical fibers, by an airgap between two optical fiber segments, by the inclusion of a filter between two optical fiber segments, or by other structures. When an optical fiber with a connector is inserted into the adapter, the optical fiber is placed in optical contact with the attenuation optical fiber of the attenuation hub. The adapter can be inserted through an opening in a bulkhead so that optical fiber from one side of the bulkhead can be attached to optical fiber on the second side of the bulkhead.

41 Claims, 10 Drawing Sheets

BULKHEAD ADAPTER WITH OPTICAL FIBER FOR SIGNAL ATTENUATION

FIELD OF THE INVENTION

The present invention relates generally to fiber optic bulkhead adapters. In particular, the present invention relates to bulkhead adapters incorporating optical fiber to provide signal attenuation.

BACKGROUND OF THE INVENTION

Adapters for optically connecting optical fiber cables are known. Often, these adapters mount in bulkheads and allow an optical fiber cable on one side of the bulkhead to be optically connected with an optical fiber cable on the other side of the bulkhead. An example bulkhead adapter for holding two mating connectors is shown in U.S. Pat. No. 5,317,663. In-line attenuators for attenuating signals transmitted by optical fiber cables are also known. Improvements to these known bulkhead adapters and in-line attenuators are desirable.

SUMMARY OF THE INVENTION

The present invention relates to bulkhead adapters for optically connecting two fiber optic cables and providing a degree of attenuation of the signals passing between the cables through the use of optical fiber as the attenuation mechanism within the adapter. The attenuation fiber is held by an attenuation hub within the adapter with sleeves mounted at either end of the attenuation hub. The sleeves receive ferrules of optical fiber connectors holding the ends of the optical fiber. The attenuation hub provides an optical connection and attenuation of optical signals between the two cables.

A method of assembling an adapter in accordance with the present invention includes providing an attenuation hub with an optical fiber inside and placing a sleeve over each of the ends of the attenuation hub. The method further includes placing the attenuation hub within a main housing of the adapter through an access opening and placing a cover over the access opening, whereby the attenuation hub is held within the housing.

An assembly in accordance with the present invention includes a fiber optic bulkhead adapter with an attenuation hub within the adapter, the hub holding optical fiber, and a fiber optic cable including a connector with a ferrule holding an end of the optical fiber. The adapter holds the attenuation hub and the connector ferrule such that the optical fibers are in optical contact.

A method of using a fiber optic bulkhead adapter is provided where the adapter includes an attenuation hub containing an optical fiber. The method includes inserting the adapter through an opening in a bulkhead and inserting a connector attached to an optical fiber cable into the adapter so the optical fiber of the cable is in optical contact with the optical fiber of the attenuation hub.

A variety of advantages of the invention will be set forth in part in the description that follows, and in part will be apparent from the description, or may be learned by practicing the invention. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of the description, illustrate several aspects of the invention and together with the description, serve to explain the principles of the invention. A brief description of the drawings is as follows:

FIG. 5 is an enlarged cross-sectional view of a portion of the fiber optic bulkhead adapter of FIG. 4.

DETAILED DESCRIPTION

Reference will now be made in detail to exemplary aspects of the present invention which are illustrated in the accompanying drawings. Wherever possible, the same reference numbers will be used throughout the drawings to refer to the same or like parts.

Figure 1:
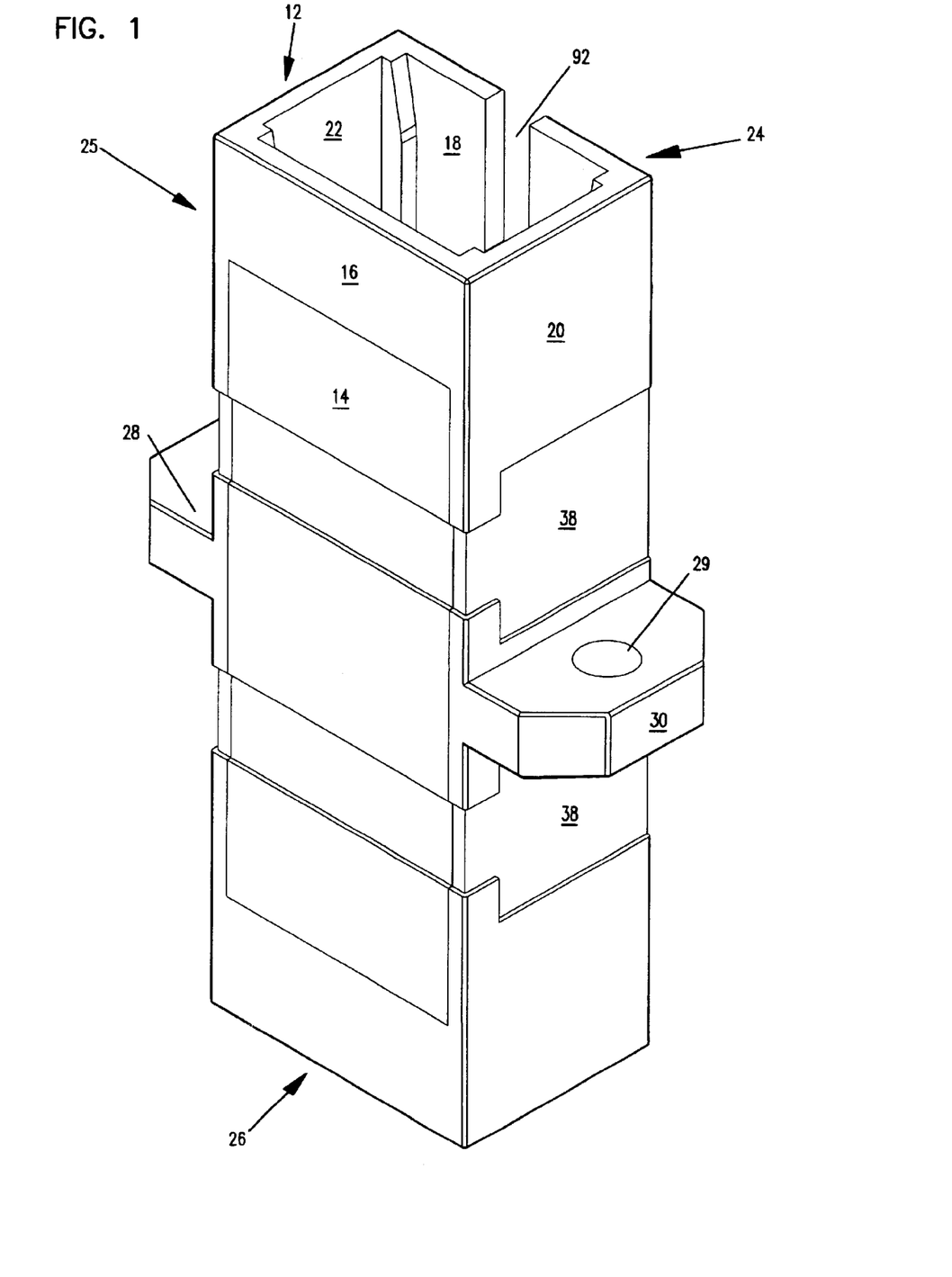
FIG. 1 is a perspective view of a fiber optic bulkhead adapter in accordance with the present invention.
Figure 2:
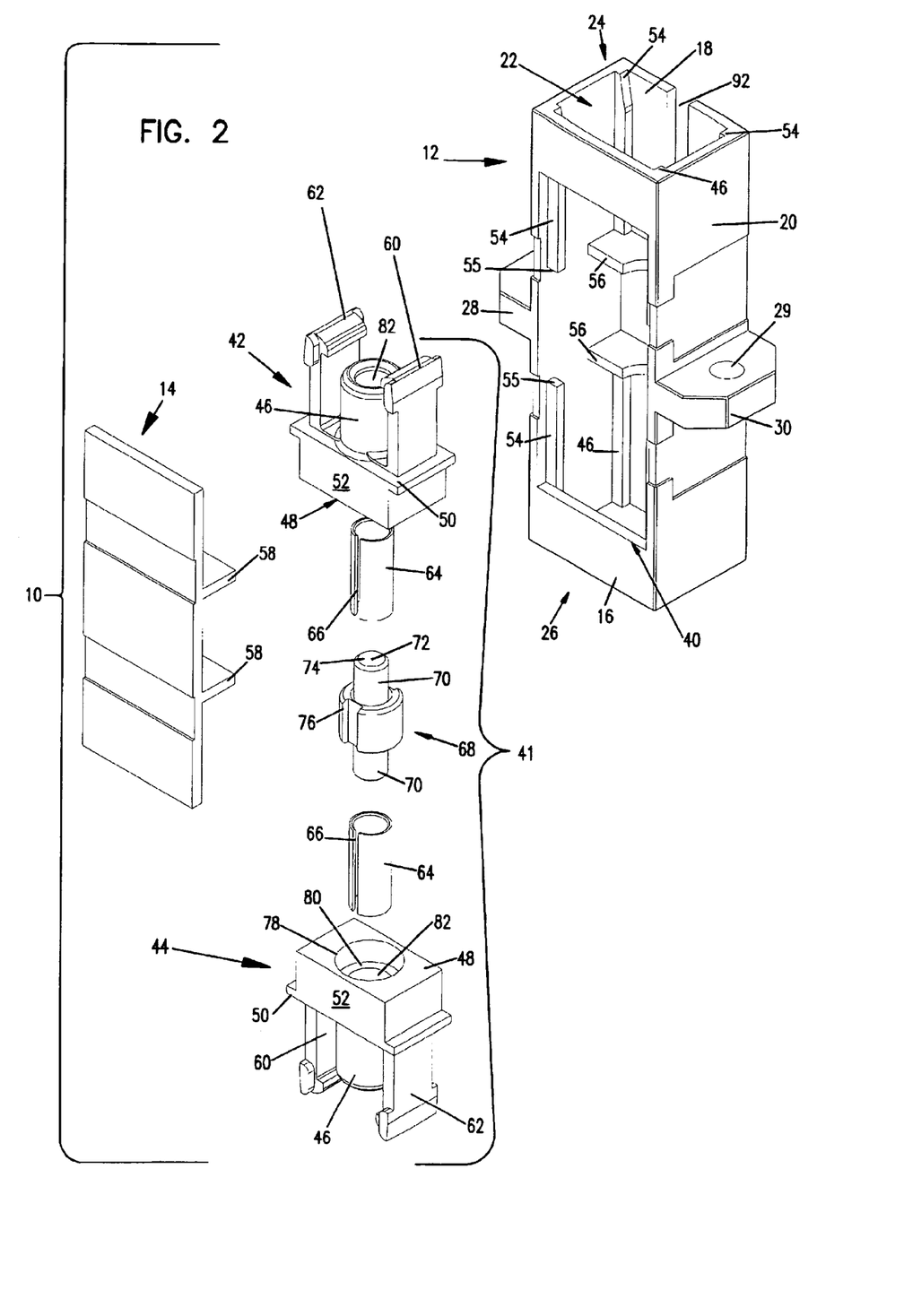
FIG. 2 is an exploded perspective view of the fiber optic bulkhead adapter of FIG. 1.
Figure 3:
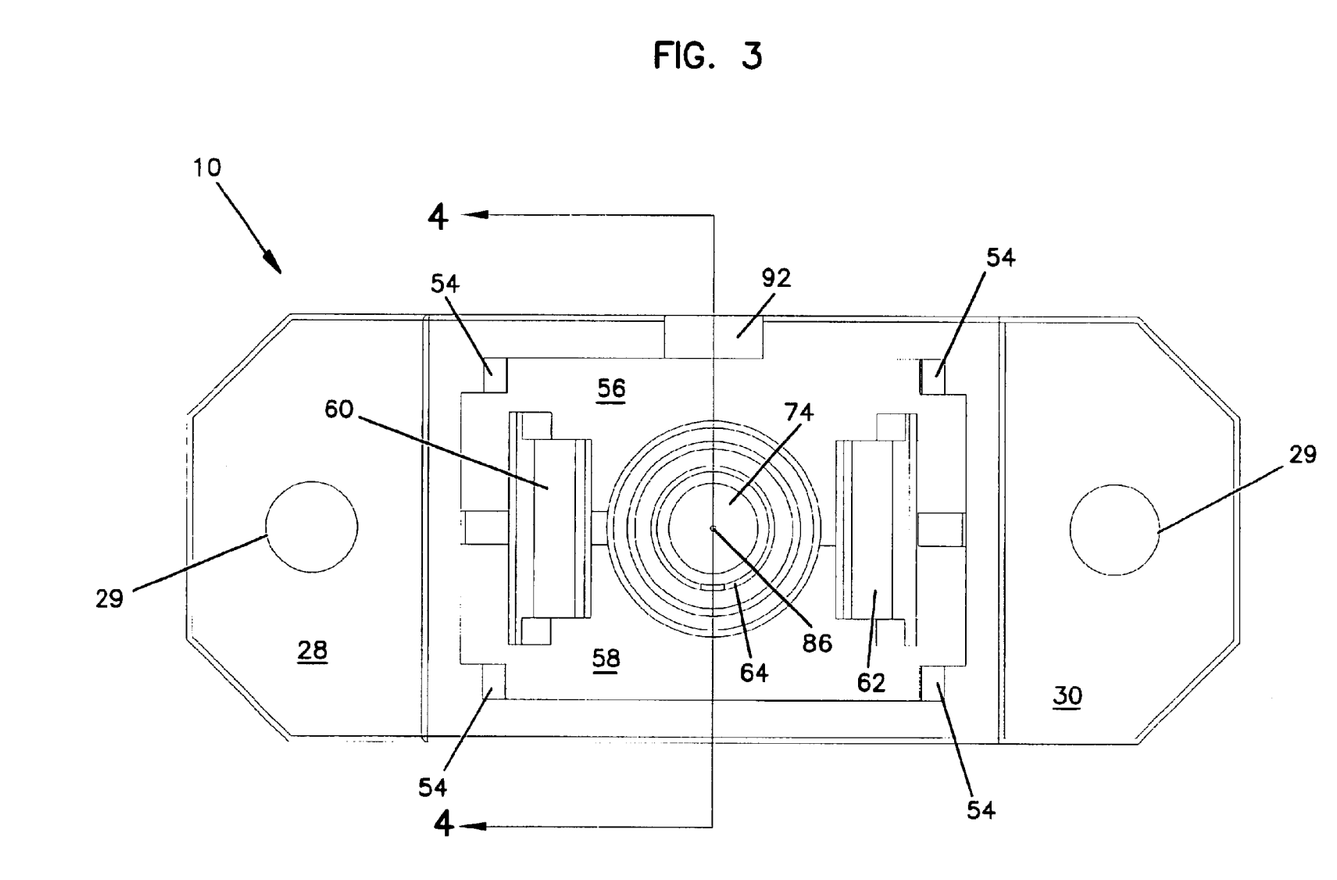
FIG. 3 is an end view of the fiber optic bulkhead adapter of FIG. 1.

A fiber optic adapter serves to optically connect two segments of optical fiber. As shown in FIGS. 1 and 2, adapter 10 contains a main housing 12 and an access plate or cover 14. In the preferred embodiment of one type of adapter (SC type), the main housing 12 includes an axial cavity, defined by a top side-wall 16, a bottom side-wall 18, a right side-wall 20, and a left side-wall 22. The axial cavity of the main housing 12 extends between a first opening 24 and a second opening 26. Each opening 24 and 26 is sized to receive a fiber optic connector. Located in bottom side-wall 18 is a keyway 92 sized and shaped to receive a corresponding key of an optical fiber connector shown in FIG. 6 and discussed below.

Figure 7:
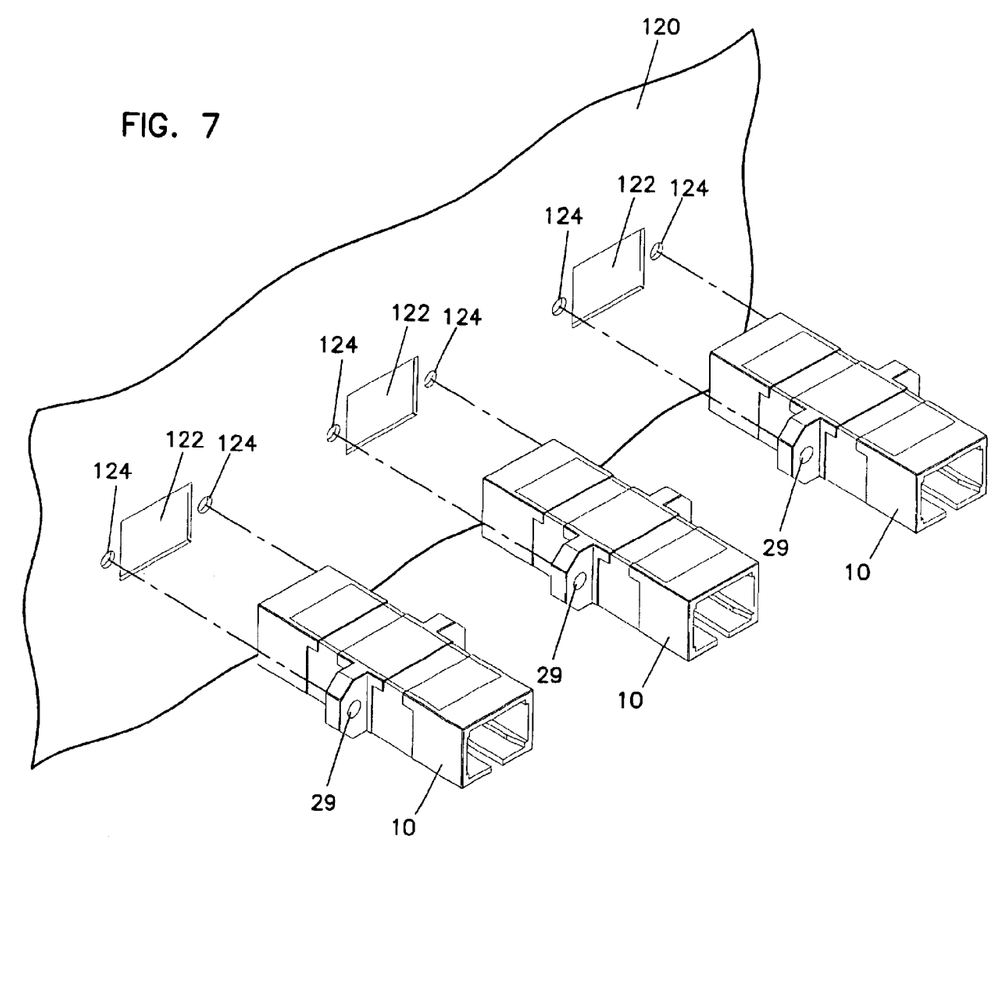
FIG. 7 is an exploded perspective view of a bulkhead for receiving adapters according to the present invention with three adapters in position to be inserted through openings in the bulkhead.
Figure 8:
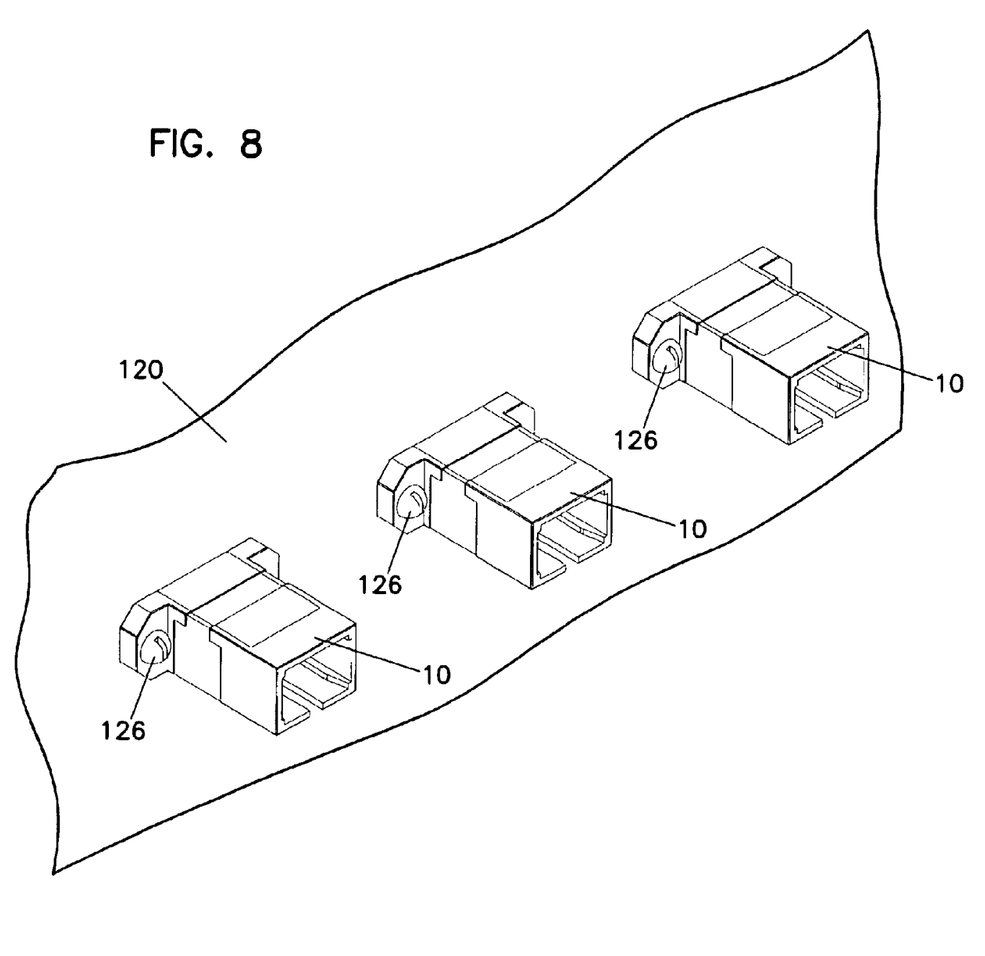
FIG. 8 is a perspective view of the bulkhead of FIG. 7 with three adapters inserted.

Located on the exterior of the main housing 12 are tabs 28 and 30. Tab 30 is located on right side-wall 20 and tab 28 is located on left side-wall 22. The tabs 28 and 30 are operative in supporting the adapter 10 on a planar surface such as a bulkhead. In the illustrated embodiments, screws or similar fasteners may be used to connect the adapter to a bulkhead, as shown in FIGS. 7 and 8, and described below. Alternatively, clips or snap fasteners, rivets, or other removable or non-removable fastening means may be used to attach adapter 10 to a bulkhead. Recesses 38 are provided in housing 12 and cover 14 to permit the use of alternative fastener means such as a flexible clip shown and described in U.S. Pat. No. 5,317,663, the disclosure of which is incorporated by reference. Angled retainers, such as those shown and described in U.S. Pat. Nos. 5,214,735 and 4,995,688, the disclosures of which are incorporated herein by reference, can be used with the flexible clips of U.S. Pat. No. 5,317,663. The angled retainer clips fit around the adapter and mount the adapter to a bulkhead at an angle to the face of the bulkhead.

Located on top side-wall 16 is an access opening 40. Access opening 40 allows inner housing assembly 41 to be inserted into the axial cavity of main housing 12 and also allows main housing 12 to be constructed by injection molding. Located on the interior of main housing 12 are ridges 54, extending longitudinally within the axial cavity along the interior corners of the axial cavity. The interior end of ridges 54 form opposing ends 55. Inner walls 56 in the axial cavity of main housing 12 and inner walls 58 on the inside of cover 14 engage ends 55.

Inner housing assembly 41 includes inner housing portions or halves 42 and 44. Inner housing halves 42 and 44 are identical in the illustrated embodiment. Each inner housing half may be constructed of plastic by an injection molding process. It is anticipated that other materials and other processes may be used for the construction of the inner housing. Each half includes a central cylinder 46 at one end, and a face 48 at an opposite end. Located intermediate along the length of cylinder 46 is ledge 50. Between ledge 50 and face 48 is a body 52. Ledge 50 is generally rectangular in shape. Two halves 42 and 44 are assembled with their respective faces 48 contiguous so that cylinders 46 of each housing half combine to define a common cylinder. The distance between the two ledges 50 is equal to that of the distance between walls 56 inside main housing 12 and between walls 58 along cover 14. Extending from each ledge 50 of the inner housing halves 42 and 44 are a pair of retaining clips 60 and 62. Each retaining clip extends away from each ledge parallel to cylinder 46. In body 52 of each inner housing half is defined a sleeve opening 82 and an attenuation hub opening 78, the opening 78 having a larger diameter than opening 82. The transition between opening 82 and opening 78 forms annular ledge 80. It is anticipated that an alternative inner housing 41 may not include intermediate hub 76 and opening 78, so that sleeve opening 82 will extend the full length of each inner housing half.

Cylinders 46 of inner housing halves 42 and 44 are preferably coaxial in main housing 12 and define a common cylinder for optical alignment of two connectors. Located in the common cylinder are two sleeves 64 generally cylindrical in shape. In the illustrated embodiment, sleeves 64 include a split, or slot 66 running the length of the sleeve. Alternatively, sleeves 64 may not include splits 66. Located between sleeves 64 is an attenuation hub 68. Attenuation hub 68 includes two ferrule ends 70, each ferrule end 70 having a contact face 74. A length of optical fiber 72 extends through attenuation hub 68 between the contact faces 74. Optical fiber 72 provides a degree of signal attenuation for optical signals. Ferrule ends 70 are sized and shaped to be inserted into sleeves 64. Between ferrule contact faces 74 around ferrule ends 70 is defined a wider intermediate hub 76. The level of attenuation provided by the illustrated embodiment of adapter 10 is determined by the level of attenuation per unit of length of optical fiber 72, since optical fiber 72 extends continuously between contact faces 74.

One manner of assembling an adapter 10 begins with the individual components as shown in FIG. 2. One of the sleeves 64 is placed into sleeve opening 82 of inner housing half 44, through opening 78. Sleeve 64 is prevented from passing entirely through opening 82 by ridge 84. One of the ferrule ends 70 is inserted into the sleeve 64 in inner housing half 44 until one end of intermediate hub 76 rests against annular ledge 80. A second sleeve 64 is placed on the ferrule end 70 extending from inner housing half 44 until it rests against intermediate hub 76 and the inner housing half 42 is placed over the inner housing half 42 so that sleeve 64 extends into opening 82. Inner housing half 42 is positioned so that faces 48 of both inner housing halves rest against each other and retaining clips 60 and 62 of each inner housing half extend parallel to each other, forming inner housing assembly 41. Inner housing assembly 41 is placed into the axial cavity of main housing 12 through opening 40 in top side-wall 16. Inner assembly 41 is positioned so that ledge 50 engages the opposing sides of inner wall 56 and retaining clips 60 and 62 are adjacent and parallel to left side-wall 22 and right side-wall 20. Cover 14 is then placed over opening 40 so that inner walls 58 engage the opposing ridge ends 55 of main housing 12 and ledges 50 of the assembled inner housing halves.

Figure 4:
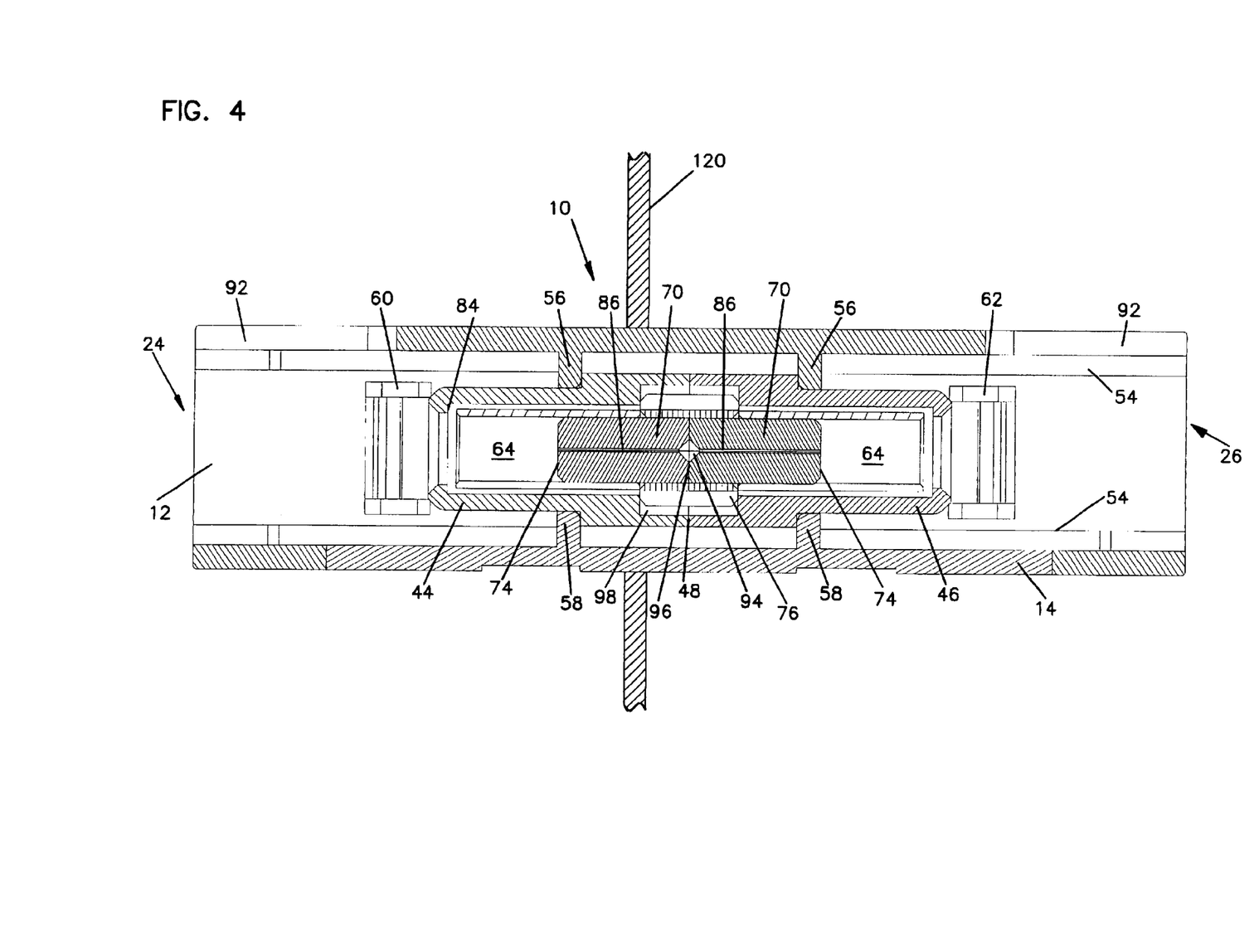
FIG. 4 is a cross-sectional view of the fiber optic bulkhead adapter of FIG. 1, taken along line 4—4 of FIG. 3.

FIGS. 4 and 5 show a cross-sectional view of an assembled adapter 10 mounted to a bulkhead 120, as shown in FIG. 8. Opening 86 extends through attenuation hub 68 and receives optical fiber 72. As shown in the illustrated example, attenuation hub 68 includes two ferrule ends 70 with intermediate hub or sleeve 76 positioned about the junction of the two halves. Ferrule ends 70 are joined along ferrule inner faces 96. Opening 86 widens into opening 94 in inner face 96. This enlarged opening 94 allows for easier insertion of optical fiber 72 into opening 86 during assembly of attenuation hub 68. To assemble attenuation hub 68, a first end of fiber 72 is inserted into a first ferrule end 70 through opening 94 and into opening 86, then through opening 86 beyond face 74 of the first ferrule end 70. The second end of fiber 72 is inserted similarly through opening 96 into opening 86 of a second ferrule end 70 and then through opening 86 beyond face 74 of the second ferrule end 70. Ferrule ends 70 are joined along their respective faces 96 and placed within an intermediate hub 76. Fiber 72 is cleaved at each face 74 and polished.

Figure 5A:
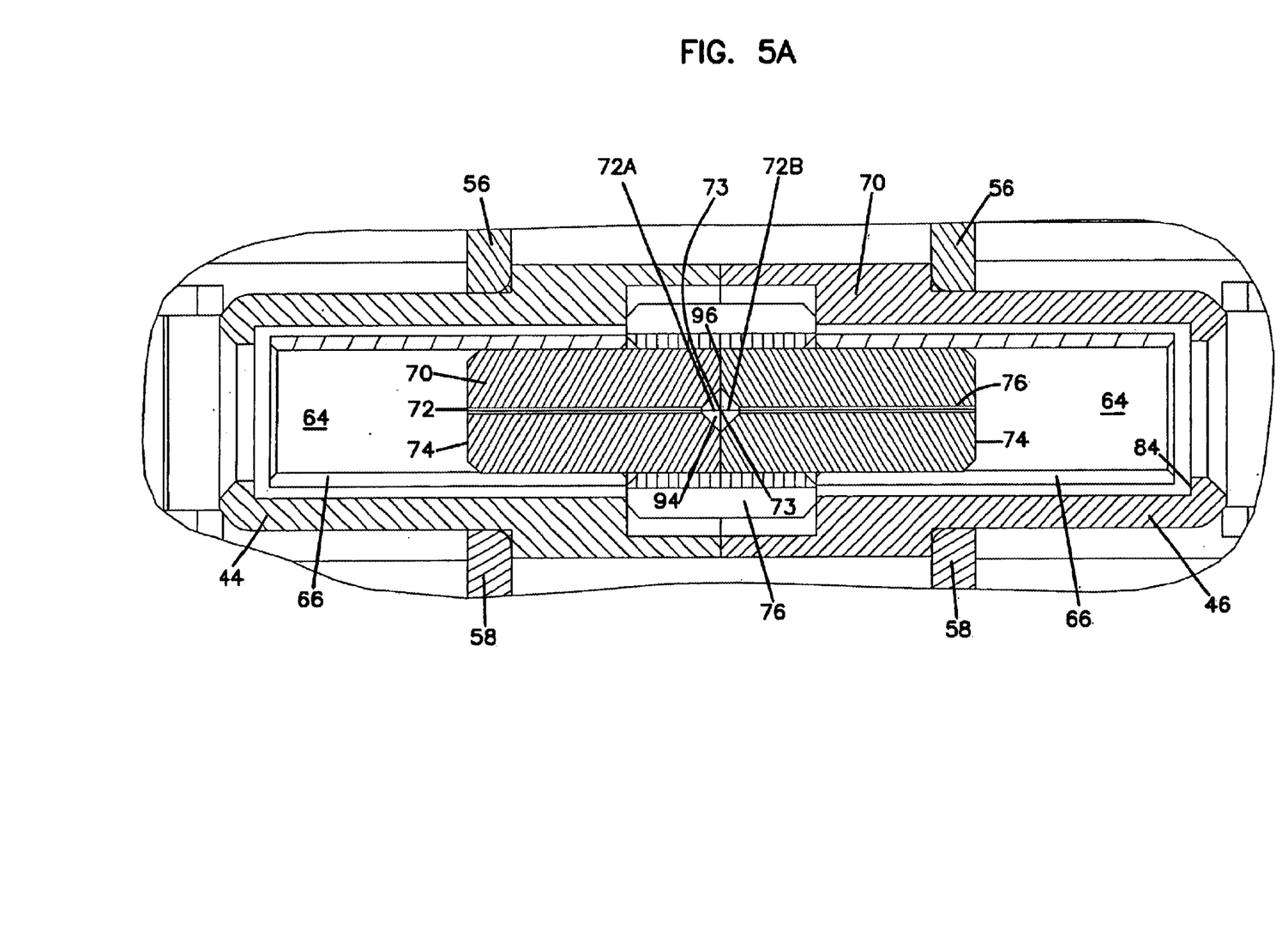
FIG. 5A is the fiber optic bulkhead adapter of FIG. 5 with the fiber optic path including two segments of optical fiber.
Figure 5B:
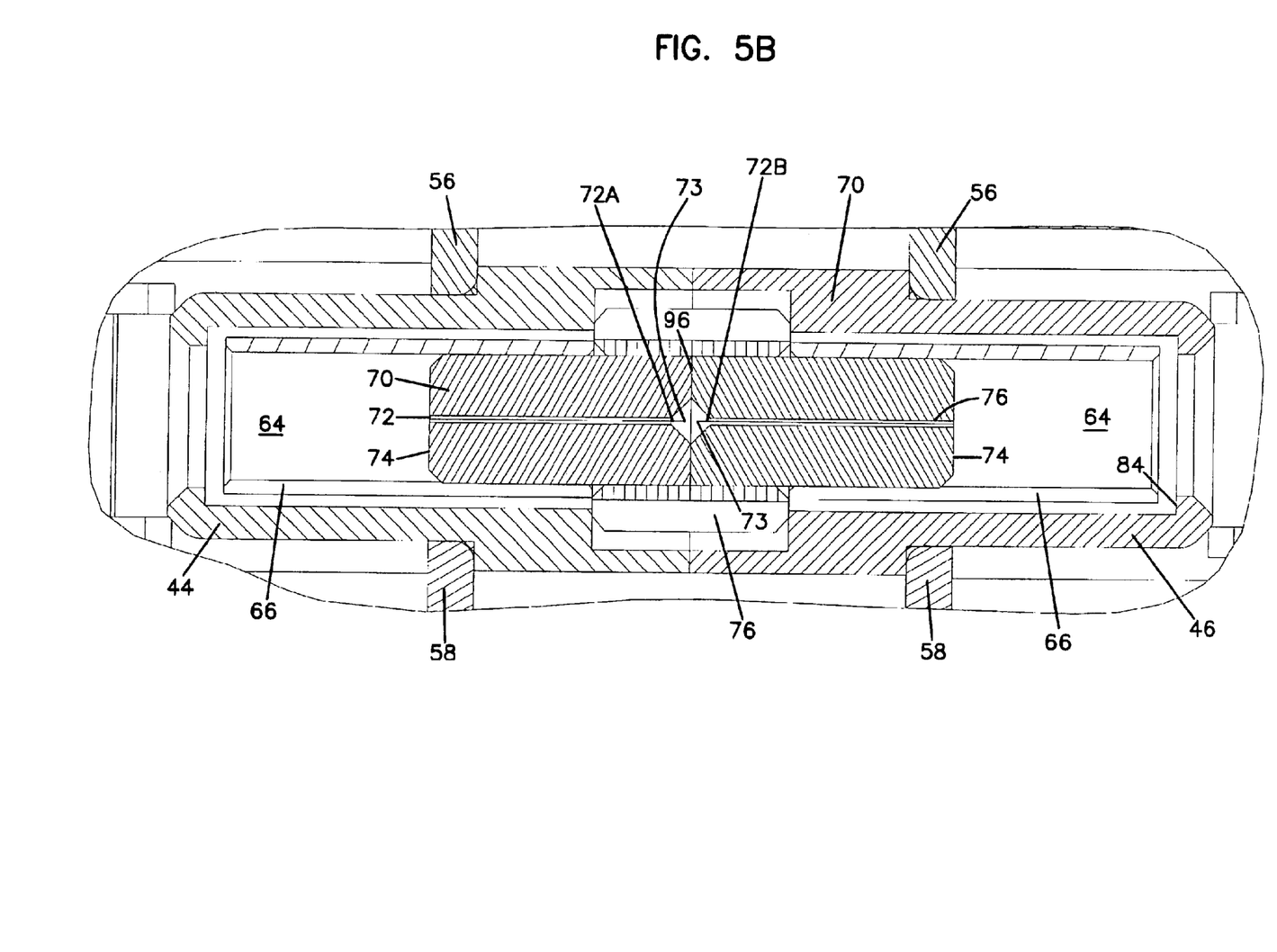
FIG. 5B is the fiber optic bulkhead adapter of FIG. 5 with an airgap in the fiber optic path.
Figure 5C:
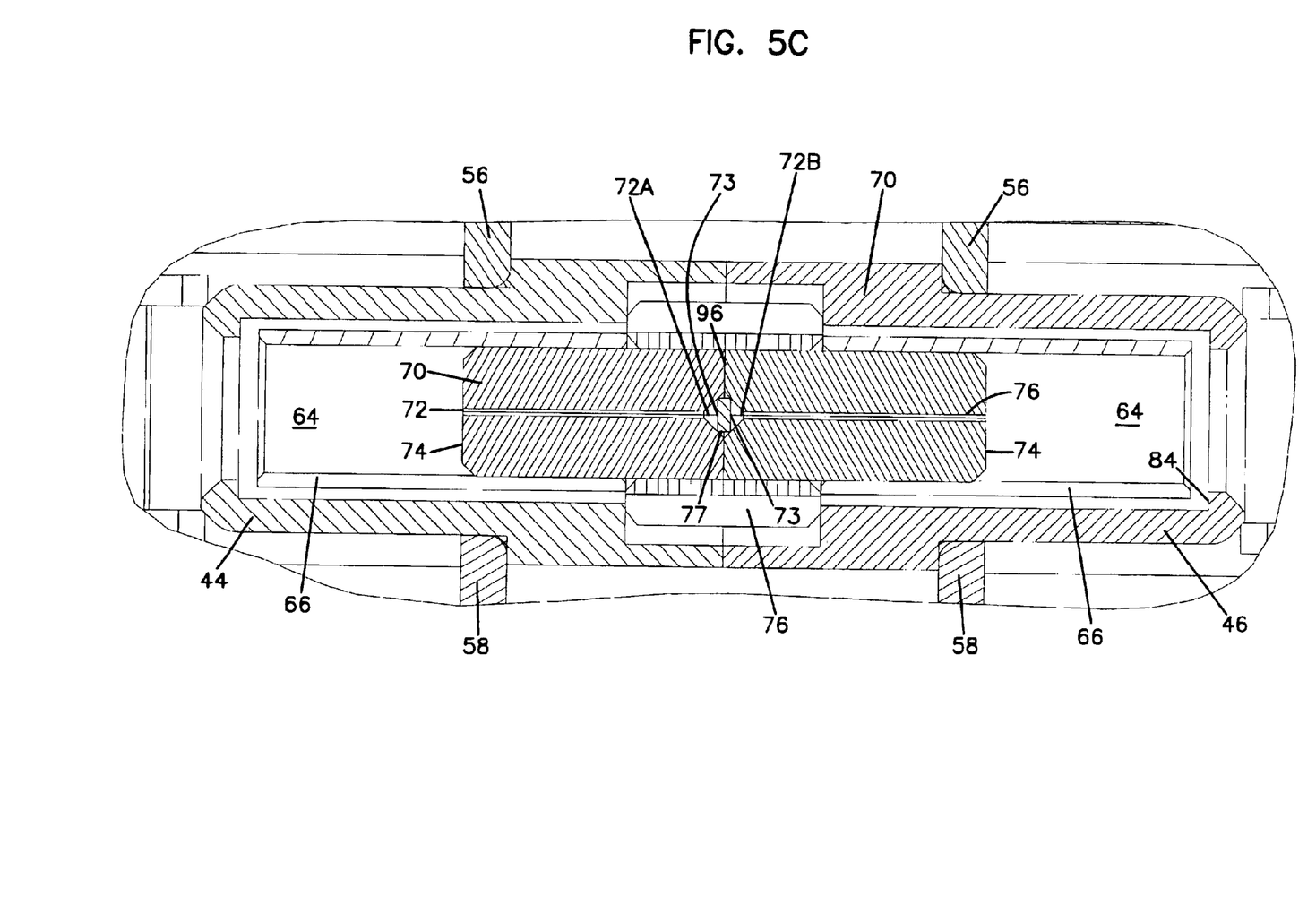
FIG. 5C is the fiber optic bulkhead adapter of FIG. 5 with a filter in the fiber optic path.

FIGS. 5A through 5C show alternative embodiments for providing attenuation for fiber optic adapter 10. FIG. 5A shows optical fiber segments 72A and 72B defining an optical path through attenuation hub 68. Fibers 72A and 72B include inner ends 73 which are fused together physically and optically. These fibers may be fused slightly offset to provide a degree of attenuation of the optical fiber signals transmitted through adapter 10. FIG. 5B shows optical fiber segments 72A and 72B defining an optical path through attenuation hub 68. Fibers 72A and 72B include inner ends 73 which are not physically touching but which are optically connected. Airgap 75 is defined between inner ends 73. Fiber optic signals transmitted through adapter 10 must pass through airgap 75, which provides a degree of attenuation of the signals. FIG. 5C shows optical fiber segments 72A and 72B defining an optical path through attenuation hub 68. Fibers 72A and 72B include inner ends 73 which are not physically touching but which are optically connected. Between inner ends 73 is filter 77. Fiber optic signals transmitted through adapter 10 must pass through filter 77 which attenuates the signal.

Figure 6:
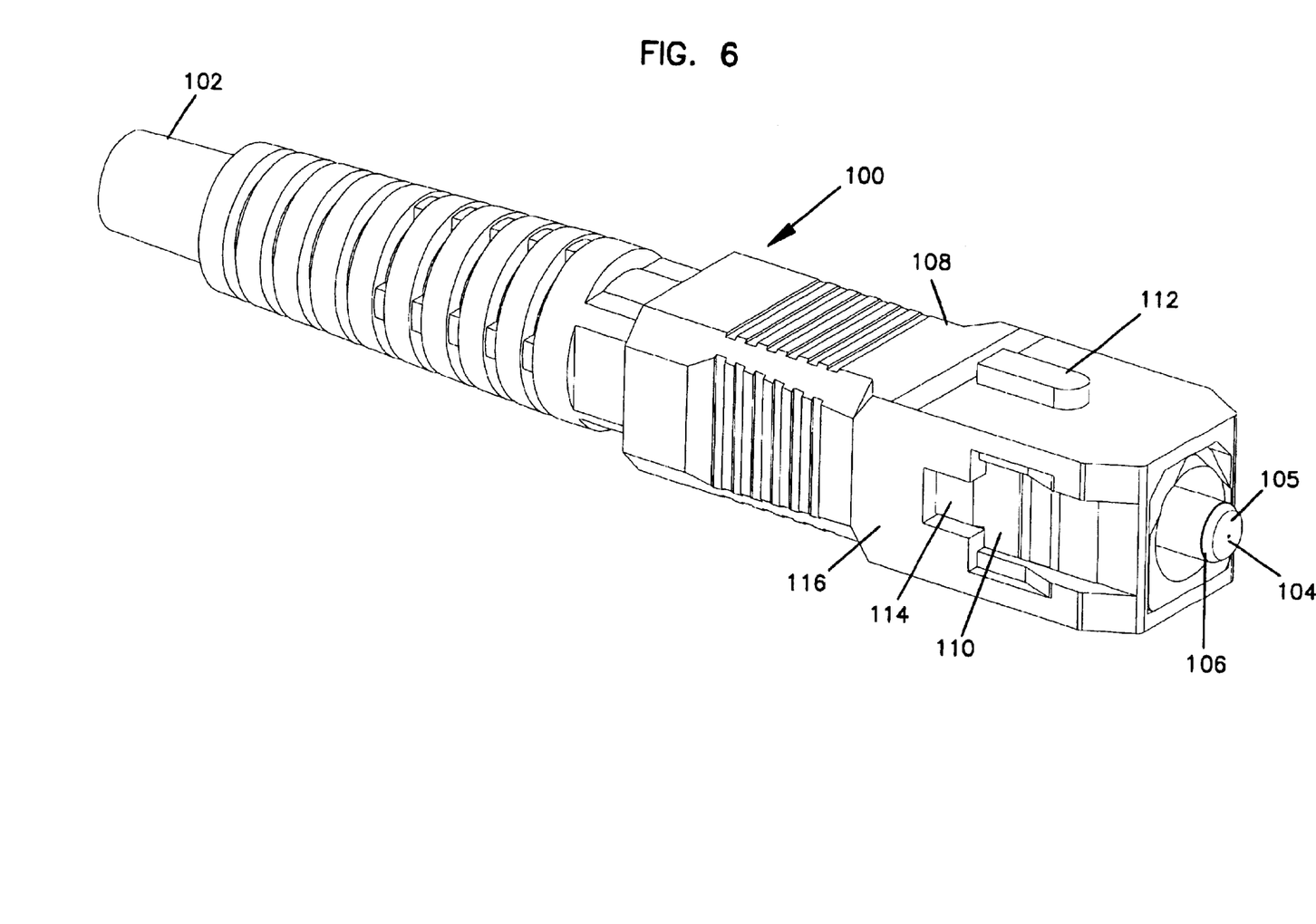
FIG. 6 is a perspective view of a fiber optic cable and connector for use with the fiber optic bulkhead adapter of FIG. 1.

FIG. 6 shows a fiber optic cable connector 100 mounted to the end of an optical fiber cable 102. Cable 102 is any variety of known cable including jacketed fiber optic cable. Connector 100 includes an optical fiber 104 which is held at the end by ferrule 106, the end of optical fiber 104 located on contact face 105. Ferrule 106 is held by housing 108 including a first inner portion 114, and an axially slidable outer portion 116. Housing 108 defines two slots 110 on opposite sides of housing 108, and a key 112 orthogonal to the sides containing slots 110 used to mount connector 100 to adapter 10. Key 112 engages keyway 92 in housing 12 to properly position connector 100 through first opening 24 within the axial cavity of adapter 10. When properly positioned within the axial cavity of adapter 10, ferrule 106 engages a sleeve 64 of attenuation hub 68. When a first connector 100 is fully inserted into adapter 10, contact face 105 is in physical contact with contact face 74, and optical fiber 104 is in optical contact with optical fiber 72. When fully inserted, openings 110 in outer portion 116 engage clips arms 60 and 62 to releasably hold connector 100 within the axial cavity of adapter 10. When a second connector 100 is inserted into opening 26 of adapter 10, an optical connection is formed between the optical fiber of the first connector 100 and the optical fiber 104 of the second connector 100 through optical fiber 72 within attenuation hub 68.

Referring now to FIGS. 7 and 8, bulkhead 120 for mounting adapters 10 is shown. As shown, bulkhead 120 includes three openings 122 for receiving adapters 10 and openings 124 adjacent to each opening 122 for receiving fasteners such as screws 126. Screws 126 are inserted through openings 29 and engage openings 124 to releasably attach adapters 10 to bulkhead 120. FIGS. 7 and 8 show bulkhead 120 with three openings 122 for receiving three adapters 10. Alternative bulkheads may have more or fewer openings for receiving adapters, depending on the number of cables to be connected.

The illustrated embodiment shows an SC connector and an adapter for receiving an SC adapter. U.S. Pat. No. 5,317,663 also shows an SC connector with a mating adapter for holding the connector. It is anticipated that the present invention can be utilized with other sizes and designs of connectors and appropriate adapters. FIGS. 10 through 16 of U.S. Pat. No. 5,883,995 show one alternative optical fiber adapter and a mating connector which may be adapted to utilize the principles of the present invention.

Having described preferred aspects and embodiments of the present invention, modifications and equivalents of the disclosed concepts may readily occur to one skilled in the art. However, it is intended that such modifications and equivalents be included within the scope of the claims which are appended hereto.

What is claimed is as follows:

1. A fiber optic adapter for use with two optical fiber connectors, each connector including a ferrule holding an end of an optical fiber, the adapter comprising:
   a housing including a first end and a second end, and an axial opening defined from the first end to the second end, the axial opening having an axial length and a midpoint, each of the first end and the second end of the housing are sized to receive one of the optical fiber connectors;
   an attenuation hub having a first ferrule, a second ferrule, a midpoint and an axial opening including an optical fiber defining an optical path from an outer face of the first ferrule of the hub to an outer face of the second ferrule of the hub, the first and second ferrules fixed in position with respect to each other, each of the first and second ferrules having an inner face substantially perpendicular to the axial opening;
   the attenuation hub positioned within the axial opening of the housing such that the optical fiber is parallel to the axial opening and the midpoint of the attenuation hub is located at the midpoint of the housing, wherein the first and second ends of the housing allow the optical fiber of the ferrule of each connector to be optically coupled with the optical fiber of the attenuation hub;
   means for mounting the housing to an opening in a bulkhead.

2. The adapter of claim 1, wherein the optical fiber of the attenuation hub includes a continuous segment from the outer face of the first ferrule of the attenuation hub to the outer face of the second ferrule of the attenuation hub.

3. The adapter of claim 1, wherein the optical fiber of the attenuation hub includes two segments fused to each other within the attenuation hub.

4. The adapter of claim 1, wherein the optical fiber of the attenuation hub includes two segments, each segment having an outer end and an inner end, and an air gap defined in the optical path between the inner ends of the optical fiber segments.

5. The adapter of claim 1, wherein the optical fiber of the attenuation hub includes two segments, each segment having an outer end and an inner end, and a filter mounted between the inner ends of the optical fiber segments.

6. The adapter of claim 1, wherein the first and second ends of the housing are each sized to receive an SC optical fiber connector.

7. The adapter of claim 6, wherein the housing includes two opposing sides parallel to the axial opening, a top and an opposing bottom parallel to the axial opening, and the means for mounting includes mounting tabs extending outward in opposite directions from the housing.

8. The adapter of claim 7, wherein the attenuation hub is included within an assembly, the assembly further comprising:
   two identical halves which form an inner housing, the inner housing enclosing the attenuation hub and having a first open end proximate the first end of the hub and a second open end proximate the second end of the hub;
   the inner housing including a first sleeve proximate the first open end and a second sleeve proximate the second open end, the first and second sleeves each adapted for receiving the ferrule of one of the optical fiber cable connectors;
   the attenuation hub mounted within the inner housing between the first and second sleeves and engaging the sleeves;
   the sleeves positioned to align the optical fiber of the connector received by the first end of the housing with the optical fiber at the outer face of the first ferrule of the attenuation hub, and the optical fiber of the connector received by the second end of the housing with the optical fiber at the outer face of the second ferrule of the attenuation hub.

9. A fiber optic adapter comprising:
   a housing including a first end and a second end, and an optical pathway connecting the first end with the second end;
   a first sleeve having a first end and a second end, the first end of the first sleeve proximate the first end of the adapter, and a second sleeve having a first end and a second end, the second end of the second sleeve proximate the second end of the adapter, the sleeves defining an inner passage to receive optical fiber ferrules in both the first and second ends;
   an attenuation hub mounted within the interior of the housing including optical fiber forming a portion of the optical path between the first and second ends of the housing, an outer end of a first ferrule of the attenuation hub received by the second end of the first sleeve and an outer end of a second ferrule of the attenuation hub received by the first end of the second sleeve, the outer ends first and second ends of the attenuation hub fixed in position relative to each other, and each of the first and second ferrules having an inner face substantially perpendicular to the optical path;

the housing including first and second stop surfaces spread apart in an axial direction, the attenuation hub and first and second sleeves positioned between the first and second stop surfaces and fixed from axial movement such that the attenuation hub and sleeves cannot be removed from the housing; and the first and second ends of the housing each sized to receive an optical fiber cable connector.

10. The adapter of claim 9, wherein the optical fiber of the attenuation hub includes a continuous segment from the outer end of the first ferrule of the attenuation hub to the outer end of the second ferrule of the attenuation hub.

11. The adapter of claim 9, wherein the optical fiber of the attenuation hub includes two segments fused to each other within the attenuation hub.

12. The adapter of claim 9, wherein the optical fiber of the attenuation hub includes two segments, each segment having an outer end and an inner end, and an air gap defined in the optical path between the inner ends of the optical fiber segments.

13. The adapter of claim 9, wherein the optical fiber of the attenuation hub includes two segments, each segment having an outer end and an inner end, and a filter mounted between the inner ends of the optical fiber segments.

14. The adapter of claim 9, further comprising a first optical fiber cable including a first optical fiber and a first optical fiber connector with a first ferrule holding an end of the optical fiber contained by the first optical fiber cable, wherein the first optical fiber connector is received by the first end of the adapter, the first ferrule engaging the first end of the first sleeve, and the optical fiber of the first optical fiber cable optically connected with the optical fiber of the attenuation hub.

15. The adapter of claim 14, further comprising a second optical fiber cable including a second optical fiber and a second optical fiber connector with a second ferrule holding an end of the optical fiber contained by the second optical fiber cable, wherein the second optical fiber connector is received by the second end of the adapter, the second ferrule engaging the second end of the second sleeve, and the optical fiber of the second optical fiber cable optically connected with the optical fiber of the attenuation hub.

16. A fiber optic adapter for use with two optical fiber connectors, each connector including a ferrule holding an end of an optical fiber, the adapter comprising:

a housing including a first end and a second end, and an axial opening defined from the first end to the second end, the axial opening having an axial length and a midpoint, each of the first end and the second end of the housing are sized to receive one of the optical fiber connectors;

an attenuation hub having a first ferrule, a second ferrule and an axial opening including an optical fiber defining an optical path from an outer face of the first ferrule of the hub to an outer face of the second ferrule of the hub, the first and second ferrules joined and fixed in position with respect to each other, each of the first and second ferrules having an inner face substantially perpendicular to the axial opening;

two halves which form an inner housing, the inner housing enclosing the attenuation hub and having a first open end proximate the outer face of the first ferrule of the hub and a second open end proximate the outer face of the ferrule of the hub;

a first sleeve proximate the first open end and a second sleeve proximate the second open end, the first and second sleeves each adapted for receiving the ferrule of one of the optical fiber cable connectors;

the attenuation hub positioned within the inner housing between the first and second sleeves with the outer faces of the ferrules engaged within the sleeves;

the first and second sleeves positioned to optically align the optical fiber of the connector received by the first end of the housing with the optical fiber at the outer face of first ferrule of the attenuation hub, and the optical fiber of the connector received by the second end of the housing with the optical fiber at the outer face of second ferrule of the attenuation hub;

the inner housing including two inner opposing ridges holding the first and second sleeves and the attenuation hub within the inner housing;

the housing including opposing walls in the axial opening engaged with outer edges on the inner housing;

the attenuation hub positioned within the axial opening of the housing such that the optical fiber is parallel to the axial opening and the attenuation hub is located at the midpoint of the housing, wherein the first and second ends of the housing allow the optical fiber of the ferrule of each connector to be in optical contact with the optical fiber of the attenuation hub;

means for mounting the housing to an opening in a bulkhead.

17. The adapter of claim 16, wherein the optical fiber of the attenuation hub includes a continuous segment from the outer face of the first ferrule of the attenuation hub to the outer face of the second ferrule of the attenuation hub.

18. The adapter of claim 16, wherein the optical fiber of the attenuation hub includes two segments fused to each other within the attenuation hub.

19. The adapter of claim 16, wherein the optical fiber of the attenuation hub includes two segments, each segment having an outer end and an inner end, and an air gap defined in the optical path between the inners ends of the optical fiber segments.

20. The adapter of claim 16, wherein the optical fiber of the attenuation hub includes two segments, each segment having an outer end and an inner end, and a filter mounted between the inner ends of the optical fiber segments.

21. A fiber optic bulkhead adapter assembly comprising:

an adapter including:

a housing with a first open end and a second open end, the housing defining an axial cavity from the first open end to the second open end;

an attenuation hub having a first ferrule and a second ferrule, the attenuation hub including a length of optical fiber extending between outer faces of the ferrules;

the first ferrule and the second ferrule of the attenuation hub fixed in position with respect to each other and an optical path including the optical fiber extending between the outer faces of the ferrules, each of the first and second ferrules having an inner face substantially perpendicular to the axial opening; and two sleeves, each sleeve engaging one of the first and second attenuation hub ferrules;

the attenuation hub and sleeves positioned within the axial cavity of the housing and defining an axial opening with a first end and a second end proximate the first open end of the housing and the second open end of the housing, respectively;

a bulkhead having a first side and a second side and defining an opening sized and shaped to receive the housing of the fiber optic adapter such that the first open end of the adapter is positioned proximate the first side and the second open end of the adapter is proximate the second side; and, the adapter mounted in the bulkhead opening such that a plane defined by the bulkhead passes through the attenuation hub.

22. The assembly of claim 21, wherein the optical fiber of the attenuation hub includes a continuous segment from the first ferrule of the attenuation hub to the second ferrule of the attenuation hub.

23. The assembly of claim 21, wherein the optical fiber of the attenuation hub includes two segments fused to each other within the attenuation hub.

24. The assembly of claim 21, wherein the optical fiber of the attenuation hub includes two segments, each segment having an outer end and an inner end, and an air gap defined in the optical path between the inner ends of the optical fiber segments.

25. The assembly of claim 21, wherein the optical fiber of the attenuation hub includes two segments, each segment having an outer end and an inner end, and a filter mounted between the inner ends of the optical fiber segments.

26. The assembly of claim 21, wherein a first cable including a first optical fiber and a first connector, the first connector including a body and a first ferrule, the body received in one of the open ends of the adapter housing and the first ferrule holding an end of the first optical fiber, the first ferrule received within the axial opening and engaging one of the sleeves of the attenuation hub within the adapter wherein the first optical fiber held by the first ferrule is in optical contact with the optical fiber within the attenuation hub.

27. The assembly of claim 26, further comprising a second cable including a second optical fiber and a second connector, the second connector including a body and a ferrule, the body received in the other open end of the adapter housing, the ferrule of the second connector holding an end of the second optical fiber, the ferrule of the second connector received within the axial opening and engaging the other of the sleeves of the attenuation hub within the adapter when the second connector is inserted into one of the open ends of the adapter, wherein the second connector inserted into the second open end of the adapter such that the second optical fiber of second cable is in optical contact with the optical fiber within the attenuation hub.

28. A fiber optic bulkhead adapter assembly comprising:
a fiber optic adapter including:
a housing with a first open end and a second open end, the housing defining an axial cavity from the first open end to the second open end;
an attenuation hub having a first ferrule and a second ferrule, the attenuation hub including a length of optical fiber extending between an outer face of each of the ferrules;
the first ferrule and the second ferrule of the attenuation hub fixed in position with respect to each other and an optical path including the optical fiber extending between the ends, each of the ferrules including an inner face perpendicular to the optical path; and
a sleeve engaging each of the first and second attenuation hub ends;

the attenuation hub and sleeves positioned within the axial cavity of the housing and defining an axial opening with a first end and a second end proximate the first open end of the housing and the second open end of the housing, respectively, the hub and sleeves fixed from axial movement such that the hub and the first and second sleeves cannot be removed from the housing;

a bulkhead having a first side and a second side and defining an opening sized and shaped to receive the housing of the fiber optic adapter such that the first open end of the adapter is positioned proximate the first side and the second open end of the adapter is proximate the second side; and the adapter mounted in the bulkhead opening.

29. The assembly of claim 28, wherein the optical fiber of the attenuation hub includes a continuous segment from the first end of the attenuation hub to the second end of the attenuation hub.

30. The assembly of claim 28, wherein the optical fiber of the attenuation hub includes two segments fused to each other within the attenuation hub.

31. The assembly of claim 28, wherein the optical fiber of the attenuation hub includes two segments, each segment having an outer end and an inner end, and an air gap is defined in the optical path between the inners ends of the optical fiber segments.

32. The assembly of claim 28, wherein the optical fiber of the attenuation hub includes two segments, each segment having an outer end and an inner end, and a filter is mounted between the inner ends of the optical fiber segments.

33. The assembly of claim 28, wherein a cable including a optical fiber and a connector, the connector including a body and a ferrule, the body received in one of the open ends of the adapter housing and the ferrule holding an end of the optical fiber, the ferrule received within the axial opening and engaging one of the sleeves of the attenuation hub within the adapter wherein the optical fiber held by the ferrule is in optical contact with the optical fiber within the attenuation hub.

34. A method of assembling a fiber optic bulkhead adapter comprising the steps of:
providing a first ferrule with an axial opening including a first outer end with a first contact face and a second opposing end perpendicular to the axial opening, a second ferrule with an axial opening including a first end perpendicular to the axial opening and a second opposing outer end with a second contact face, and optical fiber;
inserting the optical fiber within the axial openings of the ferrules;
positioning the second end of the first ferrule to the first end of the second ferrule so that the axial openings of the ferrules and the optical fiber within the axial openings are aligned with each other and form an optical path from the first contact face to the second contact face, and fixing the contact faces in position relative to each other to form an attenuation hub;
placing a sleeve about the first end of the first ferrule and the second end of the attenuation hub second ferrule so that a sleeve is positioned about each of the contact faces of the attenuation hub;
inserting the attenuation hub into a housing, the housing including an axial opening having open ends, the axial opening including sleeve stops proximate each open end, so that the sleeve stops hold the sleeves and the attenuation hub within the axial opening.

35. The method of claim 34, wherein the optical fiber of the attenuation hub includes a continuous segment from the first end of the attenuation hub to the second end of the attenuation hub.

36. The method of claim 34, wherein the optical fiber of the attenuation hub includes two segments fused to each other within the attenuation hub.

37. The method of claim 34, wherein the optical fiber of the attenuation hub includes two segments, each segment having an outer end and an inner end, and an air gap defined in the optical path between the inner ends of the optical fiber segments.

38. The method of claim 34, wherein the optical fiber of the attenuation hub includes two segments, each segment having an outer end and an inner end, and a filter mounted between the inner ends of the optical fiber segments.

39. The method of claim 34, wherein the housing is an inner housing and further comprises a main housing including an access opening providing access to an axial cavity within the main housing, the axial cavity having a first open end and a second open end, the main housing also including a cover sized and shaped to fit within and close the access opening, and the main housing further including means for mounting the main housing within an opening in a bulkhead, the method further comprising the steps of:

inserting the inner housing through the access opening into the axial cavity of the main housing such that the open ends of the axial opening are accessible through the open ends of the main housing;

placing the cover in the access opening to close the access opening and hold the inner housing within the axial cavity of the main housing.

40. A method of using a fiber optic bulkhead adapter comprising the steps of:

providing a fiber optic adapter with open ends and an integral optical fiber attenuation hub, the hub including an attenuator, a first ferrule and a second ferrule, the first and second ferrules fixed with respect to each other, and the ferrules each including inner faces which are perpendicular to the optical fiber of the attenuation hub;

mounting the fiber optic adapter directly to an opening defined in a bulkhead.

41. The method of claim 40, further including the step of:

connecting a fiber optic cable connector to each open end, each fiber optic cable connector connected to a fiber optic cable.

* * * * *